United States Patent [19]

Davies et al.

[11] Patent Number: 5,033,730
[45] Date of Patent: Jul. 23, 1991

[54] VARIABLE POSITION VACUUM ARTICLE PICKUP APPARATUS

[75] Inventors: Karen R. Davies, Menlo Park; Peter N. Newgard, Redwood City; Eric J. Shrader, La Honda, all of Calif.

[73] Assignee: SRI International, Menlo Park, Calif.

[21] Appl. No.: 486,895

[22] Filed: Feb. 28, 1990

[51] Int. Cl.⁵ ............................................. B65G 59/04
[52] U.S. Cl. ................................. 271/106; 294/64.1
[58] Field of Search ............... 294/64.1; 414/917, 737, 414/797; 271/106, 105; 901/40

[56] References Cited

U.S. PATENT DOCUMENTS

| | | | |
|---|---|---|---|
| 765,738 | 7/1904 | Kerscher . | |
| 2,203,823 | 6/1940 | Jirousek | 271/105 X |
| 2,745,665 | 5/1956 | Labombarde | 271/106 X |
| 3,008,748 | 11/1961 | Rives | 294/64 |
| 3,137,497 | 6/1964 | Good | 271/105 X |
| 3,598,263 | 8/1971 | Ehmke | 414/737 X |
| 3,773,318 | 11/1973 | Glaser et al. | 271/106 |
| 3,826,485 | 7/1974 | Shindo | 271/106 |
| 3,861,668 | 1/1975 | Wood | 271/106 X |
| 4,400,984 | 8/1983 | Rönbeck | 414/737 X |
| 4,428,793 | 1/1984 | Sato et al. | 156/285 |
| 4,516,762 | 5/1985 | Moltrasio et al. | 271/106 X |
| 4,589,648 | 5/1986 | Hancock | 271/106 |
| 4,720,227 | 1/1988 | Eberle | 271/106 X |

FOREIGN PATENT DOCUMENTS 88733  4/1987  Japan ..................................... 271/106

Primary Examiner—Johnny D. Cherry
Assistant Examiner—Joseph D. Pape
Attorney, Agent, or Firm—John P. Taylor

[57] ABSTRACT

A vacuum article pickup apparatus is disclosed which is capable of picking up single articles such as pieces of mail or sheets of paper, from a random assortment of articles of varying sizes, shapes, weights, thicknesses, and porosities. The apparatus provides a vacuum gripper and a spacer which spaces the vacuum gripper from the articles. Provision is made for adjusting the height of the vacuum gripper and the spacer to compensate for differences in height of the random assortment of articles. Provision is also made for locking the vacuum gripper and the spacer at this height during the engagement of the uppermost article, and for withdrawing the spacer from contact with the random assortment of articles after the uppermost article has been engaged by the vacuum gripper.

25 Claims, 4 Drawing Sheets

VARIABLE POSITION VACUUM ARTICLE PICKUP APPARATUS

BACKGROUND OF THE INVENTION

1. Field of the Invention

This invention relates to apparatus for vacuum pickup of an article. More particularly, this invention relates to an apparatus having vacuum gripper means and retractable spacer means which is capable of picking up a single article from a variable height stack of articles of various thicknesses, weights, materials, and porosity.

2. Description of the Related Art

In the automated handling of articles, particularly flat articles such as pieces of mail or stacks of paper, it is necessary to be able to pick up a single article or sheet from a stack of articles or sheets of various thicknesses and weights. The use of vacuum means to affect such single transport has created problems in the past because the use of a sufficient vacuum to enable a heavy article to be lifted, e.g., a 2-3 lb article, can also result in multiple pickup of light weight articles such as cards, e.g., postcards, or lightweight airmail, due to bleed through of the vacuum through the thin and/or porous article.

Conversely, reducing the amount of vacuum used, to avoid multiple pickup of light weight and/or porous articles, results in a decrease of the ability of the apparatus to carry heavier articles, particularly those having a low coefficient of friction with the vacuum means in contact with the article.

Other attempts to overcome such multiple pickup, including experimentation with mechanical means to bend light weight highly porous articles to induce airflow between the light weight porous articles, have also not been successful.

In the prior art, avoiding double feeding of light weight articles of similar size, thickness, weight, porosity etc., such as sheets of paper, has been attempted using mechanical means to kink, curve, or in other ways distort the top sheet to avoid double sheet feed. For example, Kerscher U.S. Pat. No. 765,738 teaches a vacuum mechanism for pickup of articles which uses a sucker and a member which vertically spaces the sucker from the top of the stack of articles to prevent pickup of more than one article by causing a kink in the article. The vertical spacing of the member from the stack of articles and the horizontal spacing of the member from the sucker is preset for the weight of the articles in the particular stack of articles being picked up. If the articles are heavier, the member is raised and moved farther from the sucker. If the articles are light, the member is moved down and closer to the sucker to produce a more pronounced kink in the article being raised to prevent multiple feeding.

Rives U.S. Pat. No. 3,008,748 describes a suction pickup head which comprises a central tube with a slidable sleeve mounted around the tube and an end on the slidable sleeve which is angled with respect to the central tube. When the pickup head is lowered onto a stack of sheets, the uppermost sheet is sucked up, causing the sleeve to slide back along the tube. During the upward movement of the sheet, a portion of the sheet is held against the end of the tube and a portion is held against the bottom face of the sleeve which, being at an angle to the tube, causes buckling of the sheet to promote separation of the sheet from the other sheets.

Glaser et al U.S. Pat. No. 3,773,318 discloses a sheet feeder and holder assembly wherein a pickup assembly contains sucker cylinders and fingers which both engage the top sheet of a stack. The sucker cylinder comprises a tube with a slidable cylinder around the tube which is spring biased downward toward the stack. When the sucker cylinders suck up the top sheet, the suction force retracts the slidable cylinders. However, the fingers remain in a stationary position causing the sheet to bend or flex about a line extending between the fingers which decreases the likelihood that the next sheet in the stack will also be lifted with the top sheet.

Sato et al U.S. Pat. No. 4,428,793 describes a mechanism for removal of a coverslip from a stack of same using a supporting body comprising an adhering cup and a pushing body which is spring biased to downwardly protrude beyond the end of the adhering cup. When the supporting body is lowered over a stack of coverslips, the pushing body first contacts the stack and is forced upward by the force of the descending supporting body until the adhering cup also contacts the stack. When the adhering cup makes contact with the stack, a vacuum is turned on within the adhering cup and the supporting mechanism is raised with the uppermost coverslip being lifted by the vacuum in the adhering cup. The spring loaded pushing body now pushes downward against this sheet causing it to bend. This bending causes a sliding action against a second coverslip which may be clinging to the top one so that only the top coverslip will be taken.

Hancock U.S. Pat. No. 4,589,648 teaches a pinch-action suction cup which contains a protrusion within one side of the vacuum bellows. This protrusion creates a pressure point which is asymmetric of the vacuum force center causing a top sheet to bend sharply around the protrusion, causing the top sheet to slide over a second sheet which permits the intrusion of an air boundary between the top and second sheet and opens a void volume between the two sheets under the suction head. This sliding and bending of the top sheet, relative to the second sheet, is said to prevent double feeding.

However, despite the fact that the prior art claims to have achieved success in avoiding double feeding of light weight articles of similar or identical thickness, weight, porosity, etc., there remains a problem in attempting to affect single item pickup of a random assortment of articles of varying thickness, weight, porosity, etc., as well as varying height of the stack of articles. For example, even when the use of spacers or the like to cause distortion in a top sheet are successful, as alleged by the prior art, in preventing multiple feeding of the same type of sheet or article, the mechanism necessary to perform this bending action can interfere with the transport of rigid or heavy articles.

Therefore, there remains a need for a vacuum apparatus capable of picking up single articles from a random assortment or stack of articles, particularly flat articles, of varying thicknesses, porosity, and weight, and where even the height of the stack is variable.

SUMMARY OF THE INVENTION

It is, therefore, an object of this invention to provide a vacuum article pickup apparatus capable of picking up single articles, from a random assortment, of varying height, of articles of varying thicknesses, porosity, and weight.

It is another object of this invention to provide a vacuum article pickup apparatus capable of picking up single articles, from a random assortment of articles of varying thicknesses, porosity, and weight which includes vacuum gripper pickup means and retractable spacer means which initially space the vacuum gripper mans a predetermined distance from the top of such a random assortment of articles and which may be retracted thereafter.

It is still another object of this invention to provide a vacuum article pickup apparatus capable of picking up single articles, from a random assortment of articles of varying thicknesses, porosity, and weight, which includes means for permitting vertical movement of a vacuum gripper means and spacer means, to compensate for differences in height of the random assortment of articles.

It is a further object of this invention to provide a vacuum article pickup apparatus capable of picking up single articles, from a random assortment of articles of varying thicknesses, porosity, and weight, which includes: a vacuum gripper means; spacer means, which space the vacuum gripper means from the top of the random assortment of articles; means for moving the vertical position of the vacuum gripper means and the spacer means to compensate for differences in height of the random assortment of articles; means for locking the vacuum gripper means at the height at which engagement of the uppermost article by the spacer means occurs; and means for retracting the spacer means from contact with the article stack after the height of the vacuum gripper means has been locked and the uppermost article has been engaged by the vacuum gripper means.

These and other objects of the invention will be apparent from the following description and accompanying drawings.

DETAILED DESCRIPTION OF THE INVENTION

Figure 1:
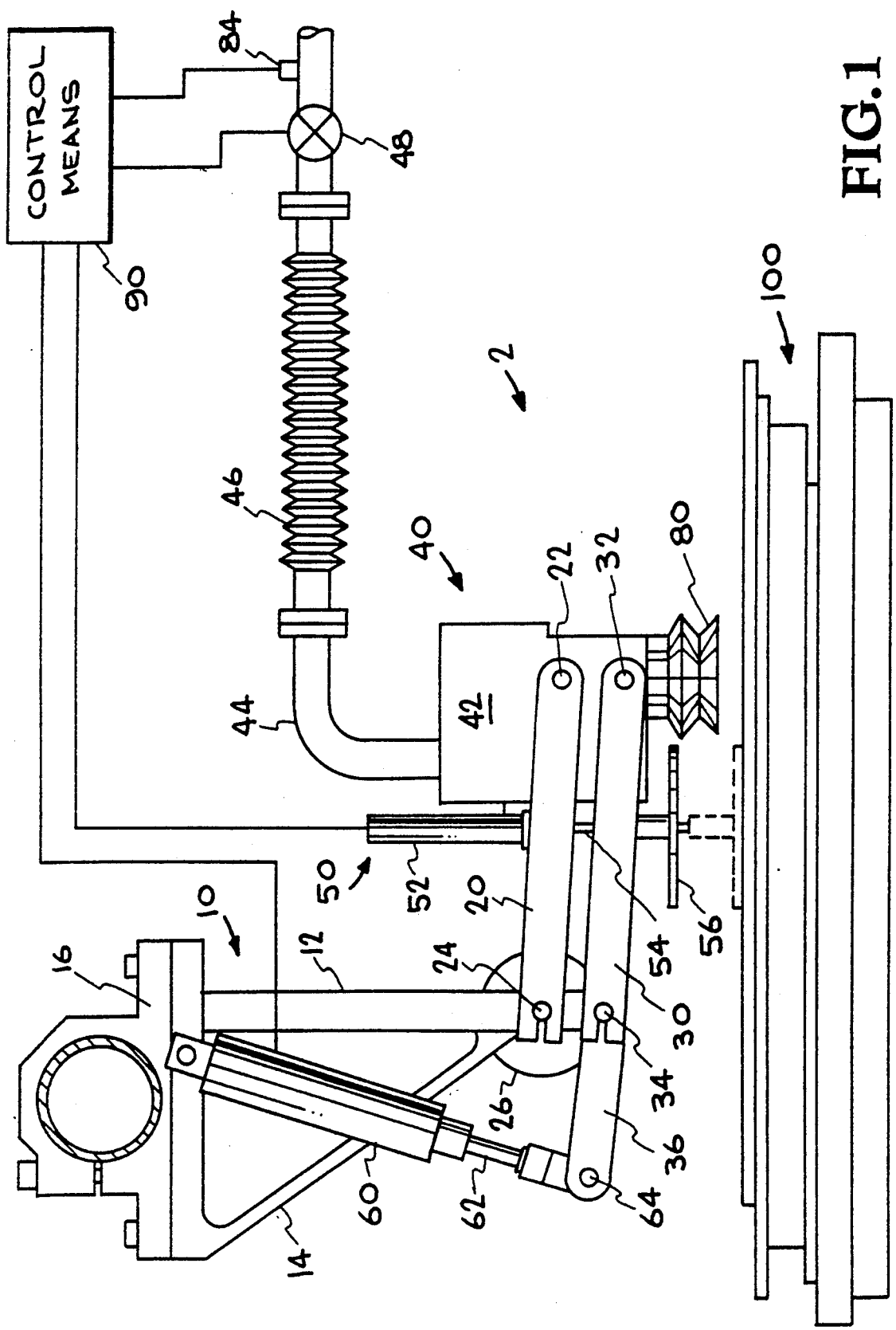
FIG. 1 is a side view of the vacuum article pickup apparatus of the invention showing details of the mechanism for raising and lowering the vacuum gripper means and spacer means to the height of the stack of articles.

Referring now to FIG. 1, the vacuum article pickup apparatus of the invention is generally indicated by the numeral 2 and may comprise a frame 10 which may adjustably carry a retractable spacer assembly 50 and a vacuum gripper mechanism 40 through a pair of suspension arms or links 20 and 30, or functionally similar mechanism, which will permit vertical movement of mechanism 40 relative to frame 10. Such vertical movement enables vacuum gripper mechanism 40 to be variably lowered to the height of a stack of flat articles beneath vacuum pickup apparatus 2 and then raised again once the steps of pickup of a single article by vacuum gripper mechanism 40, horizontal movement of mechanism 40 and the single article, and release of the article have all been accomplished.

In the illustrated embodiment, frame 10 includes a vertical frame member 12, to which suspension arms 20 and 30 are pivotally attached, a bracing arm 14, and an upper portion 16 which may comprise a carriage riding on a track (not shown) to permit lateral movement of apparatus 2, after pickup of an article, to permit conveyance of the article, for example, to another station which could comprise a robotic mechanism including pincer fingers to remove the article from gripper mechanism 40. Alteratively, the station to which the apparatus is laterally moved could comprise a moving conveyor belt onto which the engaged article is dropped. Such lateral movement of apparatus 2 and subsequent processing of the article picked up by apparatus 2 forms no part of the present invention and is, therefore, not illustrated.

Upper suspension arm 20 is shown as pivotally mounted at one end to gripper mechanism 40 via a pin 22. Arm 20 is mounted to vertical frame member 12 at the opposite end of arm 20 by a second pin 24. Pin 22 may be fixed to arm 20 and rotate in an opening in mechanism 40 or may be fixed to mechanism 40 and rotate in an opening in arm 20. However, pin 24 must be fixed to arm 20 and rotate within an opening in frame 10 since pin 24 also forms the axle for a brake drum 26 (as will be described below) wherein arm 20, pin 24, and drum 26 must rotate together as a unit.

Lower suspension arm 30 is pivotally mounted at one end to gripper mechanism 40 by a pin 32. A second pin 34 pivotally mounts arm 30 to vertical frame member 12 at a fulcrum point spaced from the opposite end of arm 30.

Gripper mechanism 40 may comprise any vacuum pickup means. In the illustrated embodiment, gripper mechanism 40 comprises a vacuum plenum chamber 42 having a vacuum inlet port 44 to which a flexible hose 46 is attached to connect chamber 42 through a solenoid valve 48 to an external vacuum pump (not shown). A vacuum sensor 84 may also be connected to hose 46, or to chamber 42, to sense the change in vacuum which will occur when an article is picked up by gripper mechanism 40 as will be explained below.

Also forming a part of gripper mechanism 40, and shown as connected to plenum chamber 42, is a retractable and expandable vacuum bellows 80 which extends downwardly from chamber 42 of gripper mechanism 40 to engage the uppermost member of the stack of articles 100 to be picked up by the action of apparatus 2.

Bellows 80 comprise a flexible tubing material which could be metal or plastic, but which preferably comprises a rubber material to provide maximum flexibility as well as long life. As will be explained below, bellows 80 should be sufficiently expandable to permit it to extend downwardly, by the action of the vacuum, to engage a heavy article which is spaced from the end of the bellows (when bellows 80 is in an at rest position) by the action of spacer means 50.

Associated with gripper mechanism 40 is a spacer assembly 50 comprising first actuating means 52, a cylinder rod 54, and an article-engaging portion 56 at the end of rod 54. Actuating means 52 may comprise a fluid power cylinder, an electrical solenoid, or a mechanical means such as a cam and spring mechanism. By way of illustration, and not of limitation, actuating means 52 will be hereinafter described as air cylinder 52.

Article-engaging portion 56 may comprise a separate member secured to the end of rod 54 of spacer assembly 50 or it may comprise the end of rod 54. By way of illustration, and not of limitation, article-engaging portion 56 will be hereinafter described as foot member 56.

Figure 2:
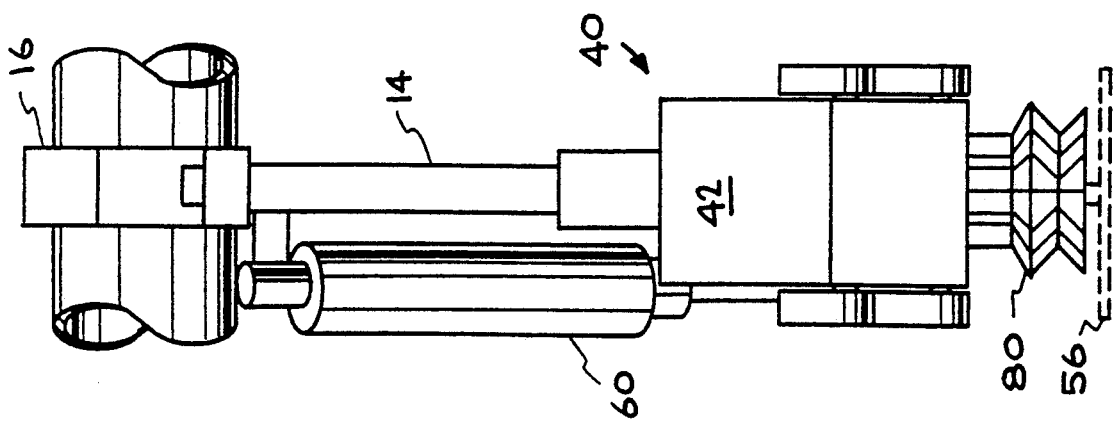
FIG. 2 is an end view of the apparatus shown in FIG. 1.

First air cylinder 52 may be double acting or it may be spring biased in its retracted position so that actuation of cylinder 52 will extend rod 54 and foot member 56 to the position shown in the broken lines in FIGS. 1 and 2. Turning off or reversing cylinder 52 then serves to retract rod 54 and foot member 56 back to the position shown by the solid lines in FIG. 1. In accordance with a key feature of the invention, when rod 54 and foot member 56 are in their extended position, foot member 56 will extend lower than the bottom of bellows 80. Therefore, when gripper mechanism 40 is lowered over a stack of flat articles or papers, foot 56 will contact the upper surface of the uppermost article or paper on the stack and space the bottom of bellows 80 from this top surface.

Spacer mechanism 50 may be conveniently attached to vacuum plenum chamber 42, as illustrated, or it may be attached to or associated with gripper mechanism 40 in some other manner which will permit spacer mechanism 50 to be vertically moved in coordination with other portions of gripper mechanism 40.

Figure 3:
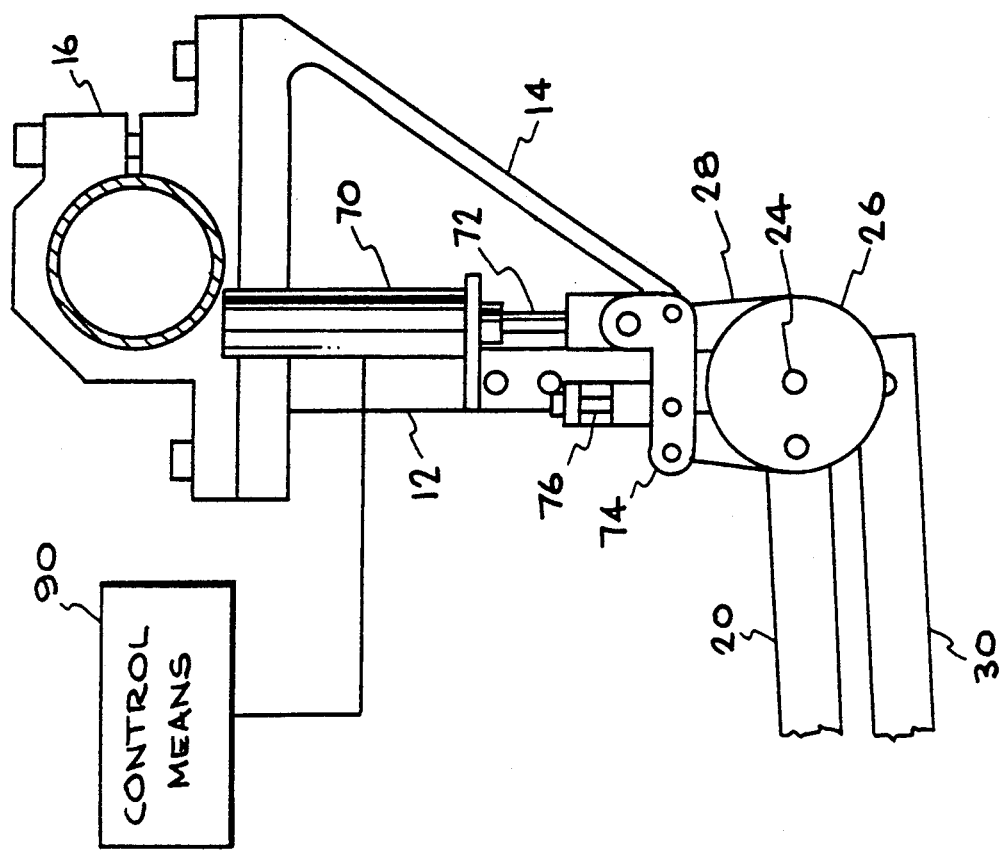
FIG. 3 is a side view of the apparatus of FIG. 1 as viewed from the opposite side from FIG. 1 to show details of the brake mechanism which temporarily locks the vacuum gripper means and spacer means at a position in contact with the top most article in the stack.

Mounted to frame 10 is a second actuating means 60, as seen in both FIGS. 2 and 3, which may be used to impart the desired vertical movement to gripper mechanism 40 and spacer mechanism 50. As previously discussed with respect to actuating means 52, actuating means 60 may comprise any one of several means, but will hereinafter be referred to as an air cylinder for purposes of illustration.

Piston arm 62 of cylinder 60 is fastened, by a pin 64, to opposite end 36 of lower suspension arm 30. As seen in FIG. 1, the apparatus is shown with gripper mechanism 40 in its lowered position over a stack of articles 100 and with piston rod 62 of air cylinder 60 in its retracted position. Actuation of air cylinder 60 to force rod 62 downward rotates arm 30 in a counterclockwise direction around pin 34 to raise gripper mechanism 40, as will be further described below. This movement, in turn, causes similar movement of arm 20 around pin 24 to ensure that the movement of gripper mechanism 40 is vertical.

Air cylinder 60 may be a single or double acting cylinder. When apparatus 2 is positioned over a stack of articles, such as a stack of paper or a stack of mail pieces, air cylinder 60 may be actuated, if a double acting cylinder is used, to lower gripper mechanism 40 and spacer means 50 down to the level of the top of the stack of papers or articles until contact is made with the stack by spacer means 50. Alternatively, if a single acting cylinder is used, gripper mechanism 40 and spacer mechanism 50 may simply be allowed to fall by gravity until contact is made with the stack of articles by spacer means 50.

Using either air cylinder 60 or gravity to cause gripper mechanism 40 and spacer mechanism 50 to simultaneously move downwardly until contact with stack 100 is made by spacer mechanism 50 results in a system or apparatus which will automatically adjust itself to the variable height of article stack 100. However, once this position has been established, and the article pickup sequence commences, it is important that gripper mechanism 40 and spacer mechanism 50 be locked or immobilized in this position where spacer mechanism 50 came to rest on top of stack 100, since one step in the pickup sequence will be withdrawal of spacer foot 56, which is the portion of spacer mechanism 50 which contacts stack 100 when gripper mechanism 40 and spacer mechanism 50 are initially urged downwardly against stack 100 by either gravity or cylinder 60.

Turning now to FIG. 3, a brake or locking mechanism is illustrated to immobilize gripper mechanism 40 and spacer mechanism 50 once foot 56 on spacer mechanism 50 contacts stack 100. The locking mechanism may comprise a brake band 28 which is tightened around brake drum 26 by activation of a third actuating means 70 which is mounted to vertical frame member 12. Third actuating means 70, like first actuating means 52 and second actuating means 60, may comprise any one of several different mechanisms, but will also be described herein, for purposes of illustration only, as an air cylinder.

Piston rod 72 of air cylinder 70 is connected to a bracket 74 to which both ends of brake band 28 are attached. Air cylinder 70 may be spring biased in an extended position to provide slack in brake band 28 around drum 26. When air cylinder 70 is actuated, rod 72 retracts to tighten band 28 around drum 26. An adjustment screw 76 can be used to adjust the tension of band 28 around drum 26.

Thus, when air cylinder 60 is turned off to allow the spring bias therein to retract piston rod 62 which moves or rotates link 30 in a clockwise manner, link 20 is also rotated clockwise, together with pin or axle 24 and brake drum 26, stopping only when foot 56 on spacer mechanism 50 contacts article stack 100. However, when cylinder 70 is then actuated to tighten brake band 28 around brake drum 26, gripper mechanism 40 and spacer mechanism 50 are then locked in this position, regardless of the subsequent positioning, i.e., retraction, of spacer foot 56, until release of the braking mechanism.

Usually a time interval is provided between initiation of the downward movement of gripper mechanism 40 and spacer mechanism 50 into contact with article stack 100, and the turn on of brake cylinder 70. This time interval is used to ensure that spacer mechanism 50 has, indeed, contacted the top of article stack 100 prior to locking of the vertical position of gripper mechanism 40 and spacer mechanism 50.

It should be noted that for purposes of clarity, braking band 28, brake air cylinder 70, and adjustment screw 72 have been omitted from FIGS. 1 and 2, while suspension arms 20 and 30 have been omitted from FIG. 2, and air cylinder 60 has been omitted from FIG. 3. It will be understood that all of the features shown in FIGS. 1-3 form a part of illustrated apparatus 2.

Figure 4:
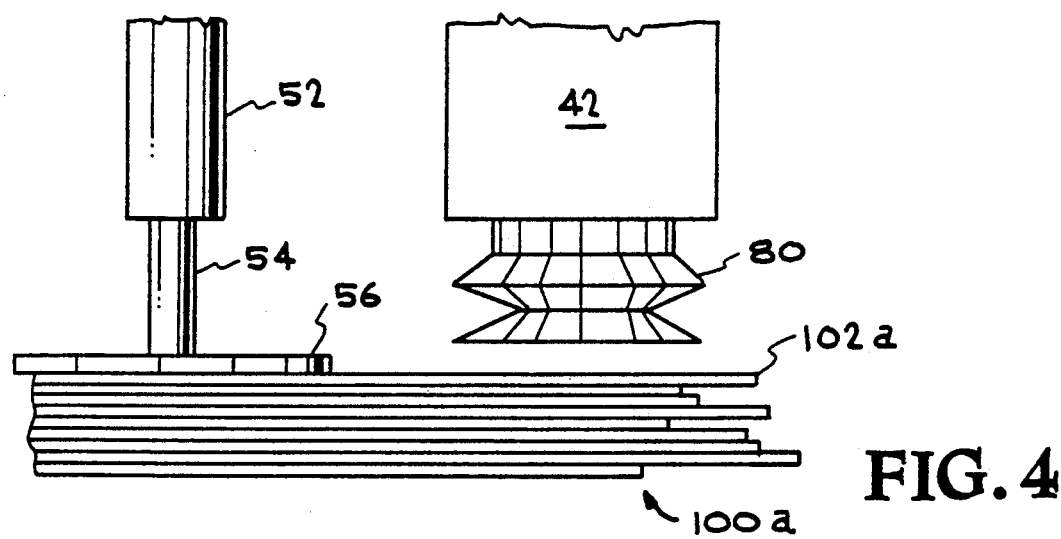
FIGS. 4-6 are fragmentary side views of the spacer means and the vacuum gripper means sequentially showing engagement and pickup of a thin article from a stack of articles.
Figure 5:
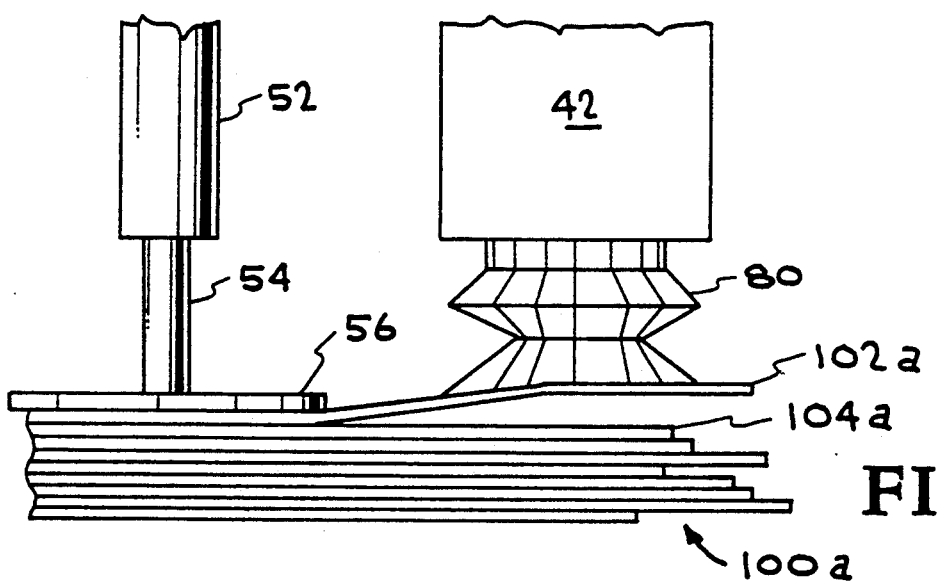
Figure 6:
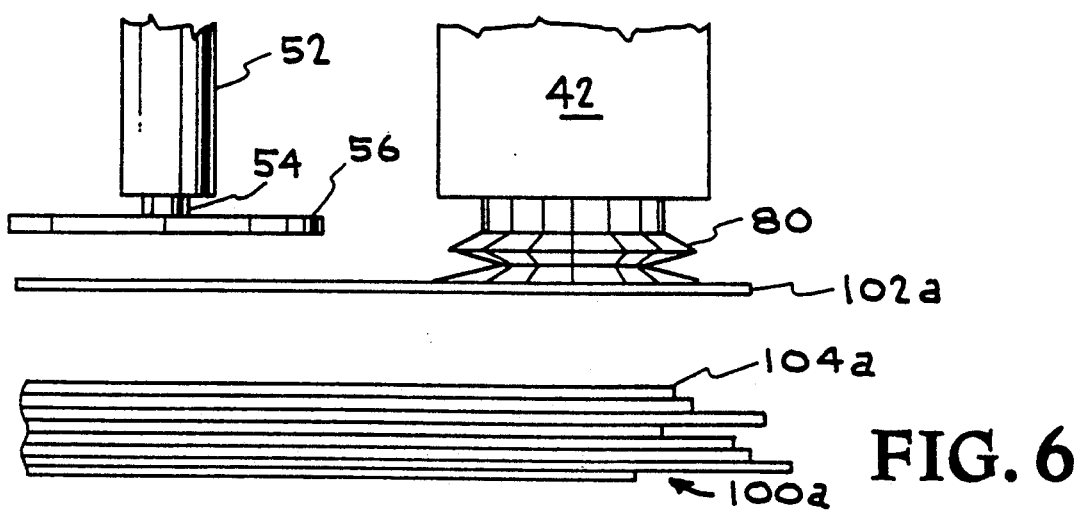
Figure 7:
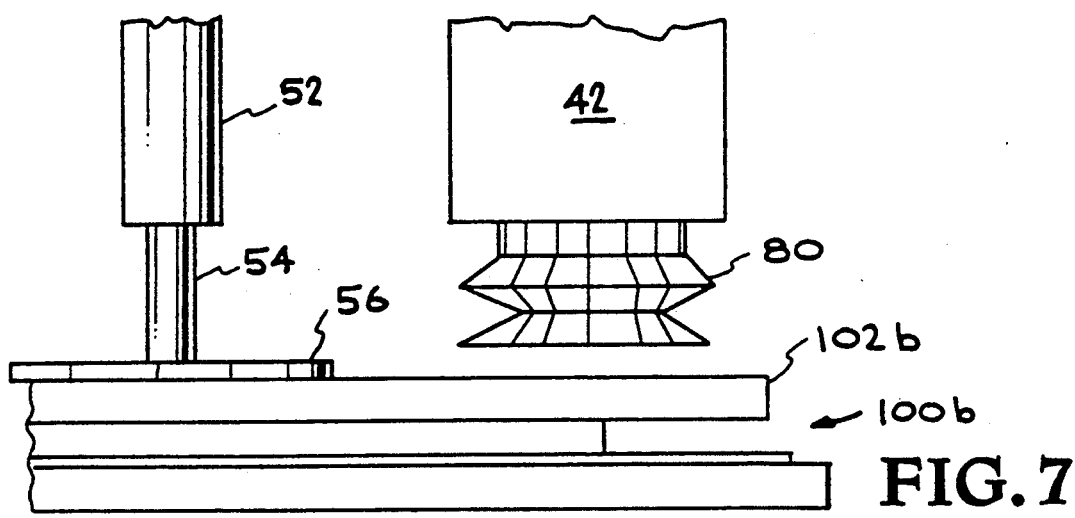
FIGS. 7-9 are fragmentary side views of the spacer means and the vacuum gripper pickup means sequentially showing engagement and pickup of a thick article from a stack of articles.
Figure 8:
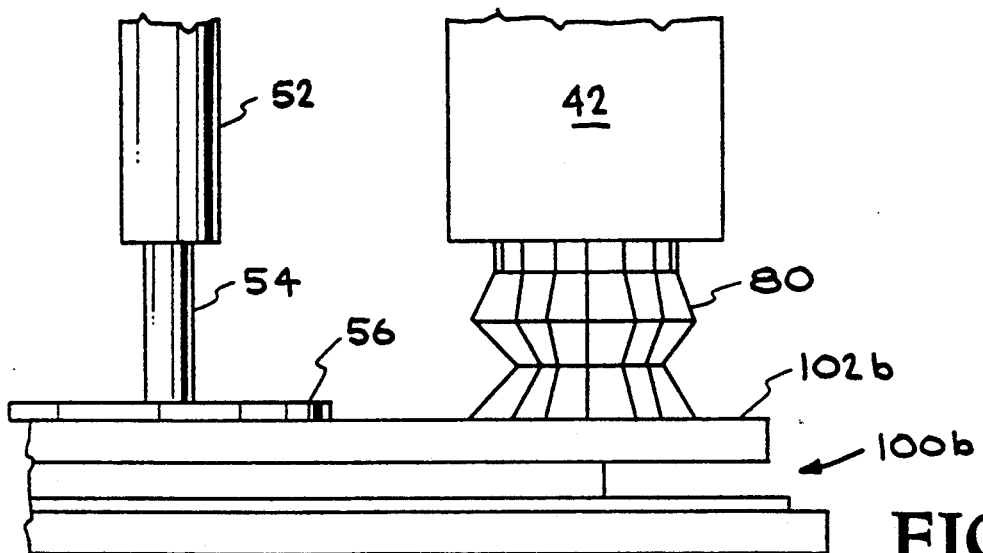
Figure 9:
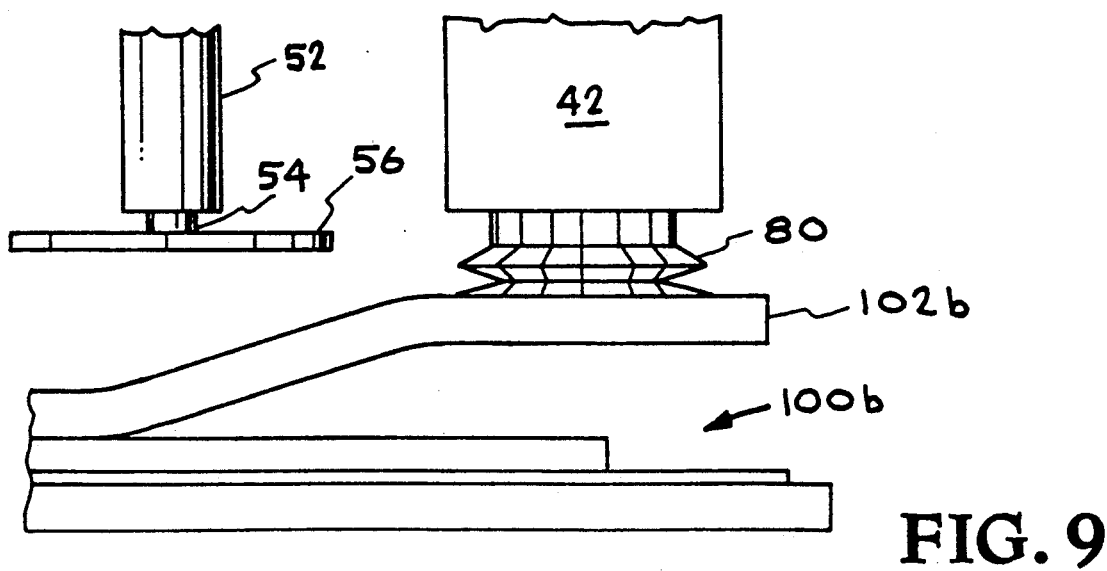

Turning now to FIGS. 4-6, as well as 7-9, the article pickup steps are shown which follow the step of locking gripper mechanism 40 and spacer mechanism 50 into position over article stack 100. FIGS. 4 and 7 show spacer mechanism 50 respectively in contact with article stacks 100*a* and 100*b* via foot 56 of spacer mechanism 50. Stacks 100*a* and 100*b* differ from article stack 100 in FIG. 1 only by the type of articles shown in the three stacks, with stack 100*a* in FIGS. 4-6 comprising thin sheets or cards to show how gripper mechanism 40 handles thin articles while the thicker articles which mainly comprise stack 100b shown in FIGS. 7-9, are intended to illustrate how the apparatus of the invention handles thick articles.

After foot 56 of spacer mechanism 50 contacts the top of article stack 100a, as shown in FIG. 4, and gripper mechanism 40 has been locked into this position by the tightening of brake band 28 around brake drum 26 by cylinder 70, the vacuum is turned on which draws the uppermost thin article 102a up to bellows 80, as shown in FIG. 5. It will be noted that foot 56 of spacer mechanism 50 is still in its extended position at this point, i.e., resting on top of article 102a as well as articles 104a, etc. beneath sheet 102a, thereby causing sheet 102a to bend slightly. This continued engagement of stack 100a, even after gripper mechanism 40 is locked into position, is maintained to assist in the attraction of only one article up to bellows 80.

However, as shown in FIG. 6, when the top sheet 102a has reached and covered the opening of bellows 80, the drop in vacuum is sufficient to prevent attraction of the second article or piece of paper across the gap created by foot 56 of spacer mechanism 50 and, therefore, foot 56 (and rod 54) of spacer means 50 may be retracted by shutting off cylinder 52. This retraction of spacer means 50 by shutting off cylinder 52 may be accomplished simply in a timing sequence, i.e., by turning off cylinder 52 after a given elapse of time following the lowering of gripper mechanism 40 onto the article stack. However, in a preferred embodiment, as shown in FIG. 1, retraction of spacer mechanism 50 may be automated using control means 90 and vacuum sensor 84 to sense the change of vacuum which occurs when bellows 80 contacts the upper article—which then results in the shut off of cylinder 52 by control means 90.

At this point, the entire apparatus may be moved laterally to a position where article 102a may be removed from gripper mechanism 40 either by a mechanical means such as a robotic pincer or, if the apparatus has been moved over to another bin or moving belt, simply by shutting off the vacuum to allow the article to drop. Gripper mechanism 40 and spacer mechanism 50 may then be raised back to their initial position, and the apparatus may then be moved laterally back to a position over the remaining stack of articles.

After release of the article, and at some point prior to gripper mechanism 40 and spacer mechanism 50 being again lowered over the stack of articles, first actuation means 52 of spacer means 50 is again caused to lower rod 54 and article-engaging portion 56 back to a position to engage the uppermost article in the stack to again space gripper mechanism 40 the desired distance from the topmost article.

In FIGS. 7-9, the same sequence of events is illustrated except that heavier article 102b is not initially moved or bent upwardly toward bellows 80, in view of the weight or bulk of the article, and the downward urging of foot 56 on article 102b, as shown in FIG. 8. Instead, bellows 80 expands downwardly to contact article 102b. Then when foot 56 of spacer mechanism 50 is retracted, as shown in FIG. 9, article 102b rises and bellows 80 retracts. Depending upon the rigidity and weight of article 102b, it may bend, as shown in FIG. 9, or it may stay flat against bellows 80. However, in either event, the article-engaging portion 56 of spacer mechanism 50, unlike the prior art uses of a spacer, has been retracted out of the way so as to not interfere with the transport of the heavier article.

In either case, i.e., whether a thick article or a thin article is engaged by bellows 80 of gripper mechanism 40, only the uppermost article is actually moved due to the initial spacing of the article stack from the bottom of bellows 80 by spacer foot 56.

The amount of space maintained between bellows 80 and the top of the article stack by spacer mechanism 50 and the amount of vacuum used are interrelated and must be regulated within certain limits to achieve the single article pickup which characterizes this invention.

To achieve single article pickup of articles ranging in size from a thin sheet of porous paper up to a thick article weighing as much as 2-3 pounds, it has been found that the space or gap between the bottom of bellows 80 (in its normal unextended position) and the top of the article stack must be maintained within a range of from about 0.15" to about 0.30". If the spacing is closer than 0.15", there may be bleed through of a thin porous piece of paper or mail, resulting in multiple article pickup. If the gap is greater than 0.30", the vacuum may be insufficient to permit the bellows to extend quickly enough to engage heavier articles such as the 2-3 pound articles previously described.

The pressure or vacuum maintained at the mouth or opening of bellows 80 must range between about 20 to 100 inches of water pressure, as measured by a manometer. If the vacuum is less than 20 inches of water, there will be insufficient vacuum to attract the heavier articles across even the minimum 0.15" gap between the article stack and the bottom of the bellows. On the other hand, a vacuum of greater than 100 inches of water, one can run the risk of multiple article pickup, even across the maximum gap of 0.30", as well as the sucking up of thin articles into the bellows which may wrinkle or distort thin articles such as cards or sheets of paper.

While the risk of multiple pickup of articles by the use of a vacuum exceeding 100 inches of water could be remedied by extending the gap to greater than 0.30", such increases in both the vacuum and the gap beyond the stated ranges could result in another problem in that the vacuum profile adjacent the region beneath bellows 80 could be undesirably widened laterally which could risk attracting light articles laterally to the bellows, in preference to a heavier article directly below the bellows, particularly if there is a delay in the bellows expansion down to the heavier object. In addition, the use of a higher vacuum, together with a larger gap, may unnecessarily raise the pumping costs and noise level to maintain the vacuum.

The pressure profile may be defined as the cone shaped region beneath the opening in the bellows where an article will be drawn toward the bellows (or the bellows toward the article). Obviously, as the vacuum is increased, the angle or slope of the edge of this cone shaped region will increase from the vertical, thus increasing the lateral dimension of the pressure profile. Theoretically, then, if the pressure profile was unduly extended lateral by the use of high enough vacuum, one might never pick up the heavier article if light weight articles adjacent the heavier article continued to be attracted to the bellows by the excessive vacuum in use.

Therefore, in addition to the gap and pressure ranges stated, the combination of gap and pressure selected within these ranges should be such that the width of the pressure profile, at the height of the article stack, does not exceed more than about 10% in excess of the radius of the opening of bellows 80.

Preferably the gap will be maintained within the narrower range of from about 3/16" to about ¼" while the pressure or vacuum will be maintained within the narrower range of from about 40 to 80 inches of water.

The sequence of operation of the vacuum pickup apparatus of the invention, once the apparatus has been positioned over the stack of articles, either by lateral movement of the apparatus, or by movement of the article stack, is as follows (with steps 7 and 8 being varried out in either order or carried out simultaneously):

1. Shut off of air cylinder 60 (or activation of downward-urging cylinder of double acting cylinder) to cause gripper mechanism 40 and spacer mechanism 50 to move downwardly toward article stack 100 until foot 56 of spacer mechanism 50 contacts the uppermost article in the stack;
2. Turn on of brake air cylinder 70 to lock gripper mechanism 40 in a fixed vertical position over stack 100;
3. Turn on of vacuum to attract top article and bellows 80 toward one another;
4. Turn off of air cylinder 52 to cause retraction of foot 56 from contact with article stack 100;
5. movement of gripper mechanism 40 in a lateral direction to an article-releasing station;
6. release of article;
7. release of vertical locking mechanism and raising of gripper mechanism 40;
8. lateral movement of gripper mechanism 40 back to original position over article stack; and
9. movement of spacer rod 54 and foot 56 on spacer mechanism 50 back to extended position.

This sequence of events is controlled by control means 90 (FIGS. 1 and 3) which may comprise electromechanical control means such as a motor turning a wheel with cammed members thereon which may sequentially directly engage air and vacuum valves to turn the air cylinders on and off and to start and stop the vacuum to plenum chamber 42 and bellows 80 in gripper mechanism 40. Alternatively such electro-mechanical control means could engage electrical switches which control solenoid valves to turn the air and vacuum flows on or off; with the time periods, in either event, controlled by the size of each cam as well as the rotational speed of the wheel. Alternatively, in the preferred mode, control means 90 may comprise computer means coupled to electrically controlled solenoid valves wherein the apparatus is electronically controlled by a computer with both the sequence and time period for each event controlled by the internal clock in the computer.

Thus, the invention provides a vacuum article pickup apparatus capable of engaging a single article from a variable height stack of articles of various sizes, shapes, weights, thicknesses, and porosities.

Having thus described the invention, what is claimed is:

1. Vacuum article pickup apparatus capable of picking up single articles, such as pieces of mail or sheets of paper, from a random stack of articles of varying sizes, shapes, weights, thicknesses, and porosities comprising:
   (a) vacuum gripper means;
   (b) spacer means which contact said stack of articles to space said vacuum gripper means from said articles;
   (c) means for varying the height of said vacuum gripper means and said spacer means to compensate for differences in height of said stack of articles, including means for lowering said vacuum gripper means and said spacer means until contact has been made by said spacer means with said stack of articles;
   (d) actuating means for urging said spacer means against said stack of articles;
   (e) means for locking the vertical height of said vacuum gripper means after contact has been made by said spacer means with said stack of articles; and
   (f) means for withdrawing said spacer means from contact with said article stack after the uppermost article has been engaged by said vacuum gripper means.

2. The apparatus of claim 1 wherein said spacer means space said vacuum gripper means from the top of said article stack a distance within a range of from about 0.15" to about 0.30" to prevent more than one article from being engaged by said vacuum gripper means.

3. The apparatus of claim 2 wherein a vacuum is maintained in said vacuum gripper means within a range of from about 20 to about 100 inches of water.

4. The apparatus of claim 3 wherein said gripper means further comprise a bellows facing said article stack and which is sufficiently flexible, at the specified vacuum range, to permit its downwardly extension toward an article, across the specified gap range, to engage an article which is too heavy to be attracted to the bellows.

5. The apparatus of claim 1 which further includes bias means for withdrawing said spacer means from contact with said stack of articles after the uppermost article has been engaged by said vacuum gripper means.

6. The apparatus of claim 5 which further includes means for releasing said article from engagement with said gripper means.

7. The apparatus of claim 6 which further includes control means to control the operation of said apparatus.

8. Vacuum article pickup apparatus capable of picking up single articles, such as pieces of mail or sheets of paper, from a random stack of articles of varying sizes, shapes, weights, thicknesses, and porosities comprising:
   (a) vacuum gripper means;
   (b) spacer means which contact said stack of articles to space said vacuum gripper means from said articles;
   (c) means for lowering said vacuum gripper means and said spacer means until contact has been made by said spacer means with said stack of articles;
   (d) means for locking the vertical height of said vacuum gripper means after contact has been made by said spacer means with said stack of articles; and
   (e) means for then withdrawing said spacer means from contact with said article stack after the uppermost article has been engaged by said vacuum gripper means.

9. The apparatus of claim 8 wherein means are provided for varying the height of said vacuum gripper means and said spacer means to compensate for differences in height of said stack of articles.

10. Vacuum article pickup apparatus capable of picking up single articles, such as pieces of mail or sheets of paper, from a random stack of articles of varying sizes, shapes, weights, thicknesses, and porosities comprising:
    (a) vacuum gripper means;

(b) spacer means which contact said stack of articles to space said vacuum gripper means from said articles;
(c) means for varying the height of said vacuum gripper means and said spacer means until contact is made by said spacer means with said stack of articles to compensate for differences in height of said stack of articles;
(d) means for locking the vertical height of said vacuum gripper means after contact has been made by said spacer means with said stack of articles; and
(e) means for then withdrawing said spacer means from contact with said article stack after the uppermost article has been engaged by said vacuum gripper means.

11. The apparatus of claim 10 wherein said apparatus is further provided with flexible bellows means which depend from said vacuum gripper means to engage said uppermost article of said article stack.

12. The apparatus of claim 10 wherein said means for varying the height of said vacuum gripper means and said spacer means further includes means for lowering said vacuum gripper means and said spacer means until contact has been made by said spacer means with said stack of articles.

13. The apparatus of claim 12 wherein said means for varying the height of said vacuum gripper means and said spacer means further includes actuating means for urging said spacer means against said stack of articles.

14. Vacuum article pickup apparatus capable of picking up single articles, such as pieces of mail or sheets of paper, from a random stack of articles of varying sizes, shapes, weights, thicknesses, and porosities comprising:
(a) article-engaging means comprising:
(1) vacuum gripper means;
(2) spacer means which contact said stack of articles to space said vacuum gripper means from said articles;
(3) means for extending said spacer means into contact with said article stack;
(4) bias means for urging said spacer means away from said stack of articles after the uppermost article has been engaged by said vacuum gripper means;
(b) means for adjusting the height of said article-engaging means to compensate for differences in height of said stack of articles including means for lowering said article-engaging means until contact has been made by said spacer means with said stack of articles;
(c) means for locking the height of said article-engaging means after engagement of the uppermost article on said stack by said spacer means; and
(d) means for releasing said article from engagement with said gripper means.

15. The apparatus of claim 14 wherein said vacuum gripper means further includes a flexible bellows having an opening therein facing said stack of articles and a vacuum within a range of from about 20 to about 100 inches of water is maintained at said opening in said bellows.

16. The apparatus of claim 15 wherein said flexible bellows facing said article stack is sufficiently flexible, at the specified vacuum range, to permit its downwardly extension toward an article, across the specified gap range, to engage an article which is too heavy to be attracted to said bellows.

17. The apparatus of claim 14 wherein said spacer means further include an elongated member having article-engaging means on one end thereof which contacts said stack.

18. The apparatus of claim 17 wherein said means for extending said spacer means into contact with said article stack comprises first actuating means and said elongated member is attached at an opposite end to said first actuating means.

19. The apparatus of claim 18 wherein said first actuating means is spring biased to withdraw said elongated member and said article-engaging means on said spacer means away from said stack when said first actuating means is shut off.

20. The apparatus of claim 17 wherein said means for extending said spacer means into contact with said article stack comprises actuating means first air cylinder means and said elongated member is attached at an opposite end to said first air cylinder.

21. The apparatus of claim 18 wherein said first air cylinder is spring biased to withdraw said elongated member and said article-engaging means on said spacer means away from said stack when said first air cylinder is shut off.

22. The apparatus of claim 16 wherein said means for lowering and raising said article-engaging means, and for adjusting the height of said article-engaging means, to compensate for differences in height of said stack of articles, comprise a second actuating means.

23. Apparatus, which includes an article-engaging means, capable of picking up single articles, such as pieces of mail or sheets of paper, from a random stack of articles of varying sizes, shapes, weights, thicknesses, and porosities, said apparatus comprising:
(a) an article-engaging means comprising:
(1) vacuum gripper means, including a vacuum chamber and a flexible bellows having an opening therein facing said stack of articles, said vacuum gripper means providing a vacuum within a range of from about 20 to about 100 inches of water maintained at said opening in said bellows;
(2) spacer means which contact said stack of articles to space said vacuum gripper means a distance of from about 0.15" to about 0.30" from the top of said articles, said spacer means including a first actuating means, an elongated member attached to said actuating means, foot means at the opposite end of said elongated member which contacts said stack when said first actuating means is activated, and spring bias means to withdraw said elongated member and said foot means from contact with said stack when said first actuating means is shut off;
(b) means for adjusting the height of said article-engaging means to compensate for differences in height of said stack of articles, said means comprising a second actuating means to permit downward motion of said article-engaging means toward said stack of articles until contact has been made by said spacer means with said stack of articles;
(c) means for locking the height of said article-engaging means after engagement of the uppermost article on said stack by said spacer means; and
(d) means for releasing said article from engagement with said gripper means comprising means for shutting off said vacuum at said bellows.

24. The apparatus of claim 23 wherein said flexible bellows facing said article stack is sufficiently flexible, at the specified vacuum range, to permit its downwardly extension toward an article, across the specified gap range, to engage an article which is too heavy to be attracted to the bellows.

25. A process for picking up single articles, such as pieces of mail or sheets of paper, from a random stack of articles of varying sizes, shapes, weights, thicknesses, and porosities comprising:

(a) lowering a vacuum gripper means and a spacer means onto a stack of articles until contact with the uppermost article is made by said spacer means;

(b) locking said vacuum gripper means and said spacer means at this height to space said vacuum gripper means from said articles;

(c) applying a vacuum to said vacuum gripper means to attract said gripper means and the uppermost article on said stack toward one another; and (d) means for withdrawing said spacer means from contact with said article stack after said uppermost article has been engaged by said vacuum gripper means.

* * * * *